Aug. 27, 1963 D. A. TAYLOR 3,101,660
VENTILATING HOOD FOR SEAT CUSHIONS
Filed April 3, 1961 5 Sheets-Sheet 1
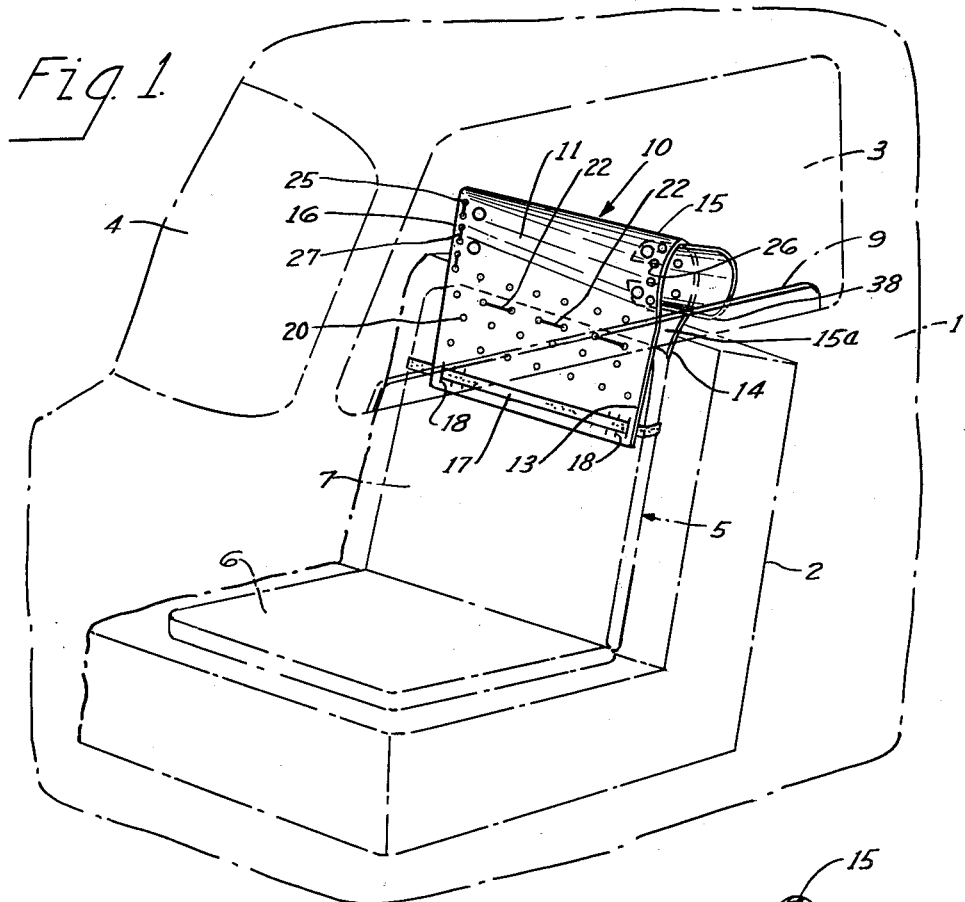
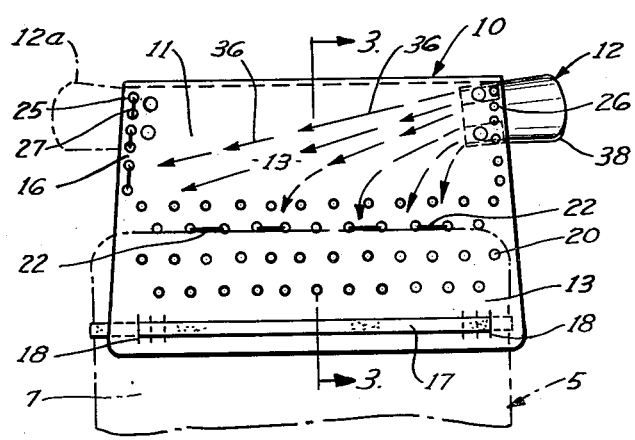
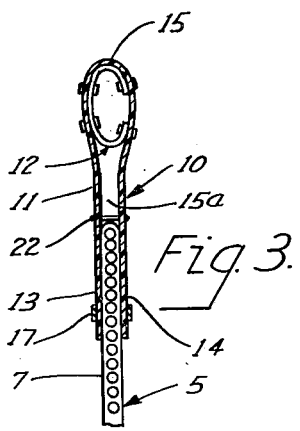
INVENTOR.
DON A. TAYLOR
BY
ATTORNEY.

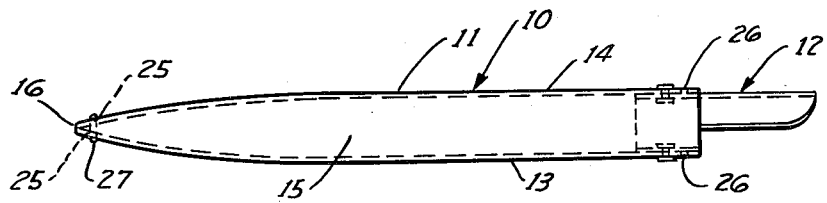
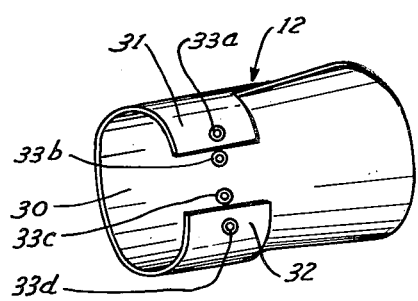
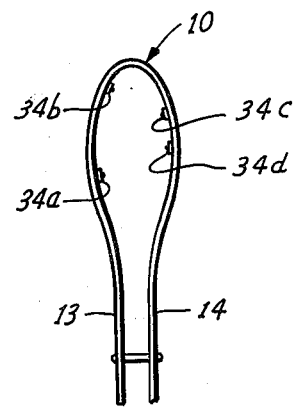
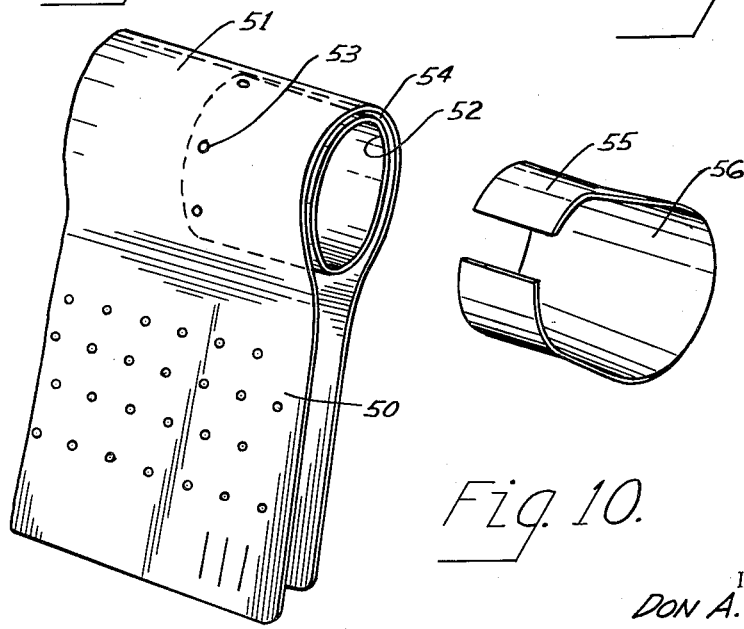

INVENTOR.
DON A. TAYLOR

Aug. 27, 1963 — D. A. TAYLOR — 3,101,660
VENTILATING HOOD FOR SEAT CUSHIONS
Filed April 3, 1961 — 5 Sheets-Sheet 4

INVENTOR.
DON A. TAYLOR
BY
his ATTORNEY.

INVENTOR.
DON A. TAYLOR
BY
*his* ATTORNEY.

United States Patent Office 3,101,660
Patented Aug. 27, 1963

3,101,660
VENTILATING HOOD FOR SEAT CUSHIONS
Don A. Taylor, 216 Mill St., Box 4, Wadsworth, Ohio
Filed Apr. 3, 1961, Ser. No. 100,317
20 Claims. (Cl. 98—2)

This invention relates to a ventilator for seat cushions, and particularly to a ventilator for the so-called air cooled types of seat cushions customarily used on automobile seats.

In present day automobiles, the conventional seat usually is one which affords little ventilation through the seat fabric and stuffing. Accordingly, so-called ventilating seat cushions have been devised as separate items for use on the seats and backs of automobile seats.

A conventional type of seat cushion is one having a seat portion and a back portion which are covered by, and joined together by, a fabric covering so that the seat portion can lie on the seat of the automobile seat while the back portion is juxtaposed against the forward face of the back of the automobile seat. The fabric covering is of relatively open weave so as to permit the ready passage of air through the entire front face of the back portion and upper face of the seat portion. In order to permit air to enter and circulate readily within the cushion and discharge in a pattern uniformly distributed over the exposed face of the covering, the interior is filled with resilient open filler or like material. The most common form of filler is a single layer of soft coil springs of large diameter with open convolutions and arranged with their axes generally parallel to the exposed face of the portion of the cushion in which they are disposed. Despite this open construction, adequate ventilation often is not obtained, and a ventilator for increasing the flow of air into and through the cushion is desirable.

Cushions of this type and ventilators for assisting in the introduction of air thereinto are disclosed in my co-pending application, Serial No. 817,274, filed June 1, 1959, and entitled "Air Intake Scoop for Ventilating Seat Cushion."

Such cushions vary in size, the backs thereof vary considerably in height, and the top edges of the backs are differently contoured. Therefore, it is necessary that a ventilator therefor be one which can be adjusted readily so that it can be installed on any one of a number of different conventional cushions offered on the market. Further, it should be such that it can be readily removed and changed from one type of ventilated cushion to another. It should be readily removable from the cushion so that it can be laid aside for short intervals of an hour or so during which a temporary temperature drop makes its use undesirable, yet it should be readily replaceable when the temperature rises again to a degree that renders the use of the ventilator desirable. It should be adjustable so as to allow for variations in the height of seat backs, for differences in window heights, and for differences in locations of seats, and such, so that it can be accommodated readily to many models of automobiles. It must be such that its operation is not interfered with by the body of a driver should the driver sit pressed against the side door. Likewise, it must permit adjustments to allow for variations in drivers' size, differences in the relative position of seat and window, and particularly in the height of the bottom of the window opening. Since such cushions have a short life, it should be detachable readily so that it can be removed, adjusted, and reinstalled quickly on a replacement cushion. It should be so arranged as to operate effectively without protruding outwardly from the window opening.

The ventilator of the present invention is one which is so constructed and arranged that it meets these requirements. It is inexpensive and simple to manufacture, adjust and install. Further, it is one that has the advantage that the same structure can be used on cushions on left or right hand seats, thus greatly reducing the inventory required by retail outlets and the stock and tools required by the manufacturer.

Various other objects and advantages will become apparent from the following description wherein reference is made to the drawings, in which:

FIG. 1 is a perspective view of the ventilator installed on a ventilating seat cushion, the seat cushion, automobile seat and portions of the automobile being diagrammatically indicated to show the cooperation of the ventilator therewith;

FIG. 2 is a front elevation of the ventilator and part of the structure illustrated in FIG. 1;

FIG. 3 is a cross sectional view taken on the line 3—3 in FIG. 2;

FIG. 4 is an enlarged top plan view of the ventilator shown in FIG. 1;

FIG. 5 is a perspective view showing the detachable air scoop forming a part of the ventilator, when viewed generally from the front of the seat;

FIG. 6 is an enlarged fragmentary right end elevation of the ventilator illustrated in FIG. 4, with the air deflector thereof removed, and showing one form of attachment means for the deflector;

FIG. 10 is an exploded fragmentary perspective view showing a modification of the invention;

Figure 7:
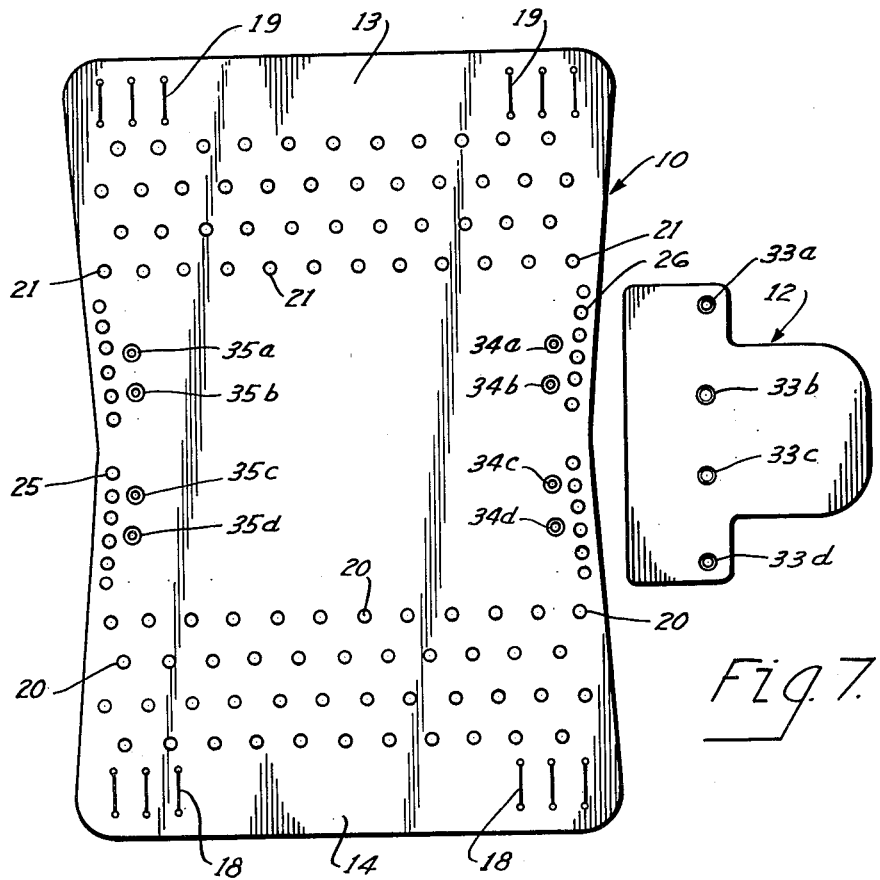
FIG. 7 is a plan view of the single sheet material forming the ventilator body and the single sheet forming the deflector, showing the relation of the attachment means of the body and deflector.

Referring to the drawings, the ventilator is shown installed in an automobile, indicated generally at 1, having a front driving seat 2, a side window 3, and a windshield 4, all conventionally arranged. A ventilating cushion 5 having a seat 6 and a back 7 is disposed on the front seat in position for use by the driver of the car. The window has a glass pane 9 which may be raised or lowered in the conventional manner.

The ventilator 10 is mounted on the upper portion of the back 7 of the seat cushion and comprises generally a body 11 and an air deflector 12. The body 11 preferably is formed of a single sheet of relatively stiff, but resilient, material which is partially folded to provide a front flap 13 and a rear flap 14, with a hood 15 joining the two. These flaps are adapted to be received in juxtaposition to the front and rear faces, respectively, of the upper portion of the back 7 of the seat cushion. The hood 15 is in the form of a downwardly open channel having a top wall spaced above the upper edge of the seat back 7. The channel is open at one end and closed or restricted at the other end. The channel is disposed with its open end at or near the outboard edge of the seat and extends generally horizontally from one lateral edge of the ventilator to the opposite lateral edge so as to permit relatively free passage of air from one end thereof to the other. The deflector 12 is arranged to project in the open outboard direction from the outboard end of the hood at the rear wall portion of the hood, so that air striking the deflector will be deflected into the hood.

The hood 15 is, as mentioned, open at its bottom side, as indicated at 15a, the opening extending the whole length of the hood so that the entering air can pass readily directly downwardly through the fabric along the entire top edge of the back 7. The end 16 of the hood opposite from the deflector 12 is closed or restricted so as to assure that most of the air will be thus deflected downwardly into the back 7.

The flaps 13 and 14 are held in firm juxtaposition to the front and rear faces, respectively, of the cushion back 7 by means of a suitable tie band 17 which preferably is elastic and adjustable in length. A plurality of slots 18 and 19 are provided, as best shown in FIG. 7, at the lower margin of the front flap 13 and of the rear flap 14. The tie band 17 is passed through selected ones thereof for fitting backs 7 of different widths, and into embracing relation to the back 7, as illustrated in FIG. 1, and is drawn tightly thereabout. Due to the elastic band, the ventilator can readily be detached and removed from the cushion and installed on another, or shifted from a left hand to a right hand position.

It is desirable that the hood be installable on cushion backs 7 of different heights and so as to be regulatable with respect to the window and to the body of the driver. For this purpose, a plurality of apertures 20 are provided in the front wall or flap 13 and a plurality of apertures 21 are provided in the rear wall or flap 14. A draw string 22 is passed back and forth through aligned ones of the apertures in the front flap and rear flap and drawn snug, thus avoiding the spreading apart of the flaps from each other. The apertures 20 and 21 are arranged in rows extending in a direction parallel to the length of the hood and spaced from each other. Enough rows are provided sufficiently close together so that the draw string passed through holes bridges across the space between the flaps and forms an open abutment to prevent the back 7 from passing into the hood. The spacing of the rows permits the string to be adjusted toward and away from the hood so as to permit selection of the height at which the hood is disposed above the upper edge of the back 7. The draw string may be woven through the apertures to provide curved and other vertical patterns of support required for resting upon the upper edge of the seat cushion backs of different contours.

As mentioned, the end 16 of the hood 15 opposite from the deflector 12, is likewise closed or so restricted that most of the air passes downwardly between the flaps 13 and 14. At the same time, it is desirable to shift the ventilator from the left-hand seat, as illustrated, to the right-hand seat while locating the deflector 12 at the outboard side of the selected seat. Accordingly, rows of holes 25 and 26 are provided in opposite upright edges, respectively, of the hood 15, in the front and rear walls thereof, and, as best illustrated in FIGS. 1, 2, and 4, a draw string 27 is passed through a selected set of holes at the selected end and drawn tightly so as to close or greatly restrict the passage of air at the end. Thus, by shifting the draw string, either end of the hood 15 can be left open for installation of the deflector 12, and the opposite end closed.

In order to make possible the transfer of the deflector 12 from one end of the hood 15 to the other, the deflector 12 is formed separately from the body 11 and is arranged to be fastened thereto detachably by suitable detachable fastening means. As an example, the deflector 12 may be provided at its attaching end with a neck portion 30 having flaps 31 and 32 faced forwardly from the general plane of the deflector 12. The collar and flaps are preformed to a size larger than the cross section of the hood and hence must be contracted for insertion. When released in the hood, they expand, hence grip against, and reinforce, the hood walls where overlapped therewith. The flaps 31 and 32 and the collar 30 are provided with snap fasteners 33a, 33b, 33c and 33d, arranged as best illustrated in FIG. 5. The outboard end of the sleeve is provided with a row of complementary snap fasteners 34a, 34b, 34c and 34d. The inboard end of the hood also is provided with a row of snap fasteners 35a, 35b, 35c and 35d. By inserting the collar portion of the deflector 12, with the flaps 31 and 32, into the interior of the hood 15 at its outboard end, as illustrated in FIG. 1, the snap fasteners 33a–33d can be fastened to the corresponding snap fastener elements 34a–34d in the hood, thus supporting the deflector in the hood in the desired position. This position is one in which the deflector 12 extends in the outboard direction from the outboard edge of the hood in a position in which it is slightly upwardly tilted from its inner to its outer end. At the same time, the inner or free edges of the collar portion 30 curve down to form internal deflectors, as best illustrated in FIGS. 1 and 2, which tend to deflect the air passing from the deflector into the hood downwardly against, and transversely of, the back 7, as indicated by the arrows 36 in FIG. 2.

If it is desired to use an identical ventilator 10 on the left seat, but arrange it so that the deflector 12 extends in the outboard direction from the left seat, then the draw string 27 is removed and passed through the apertures 26 at the opposite edge of the hood 15, and the deflector 12 is mounted on the left outboard, and now open, end of the hood.

Figure 8:
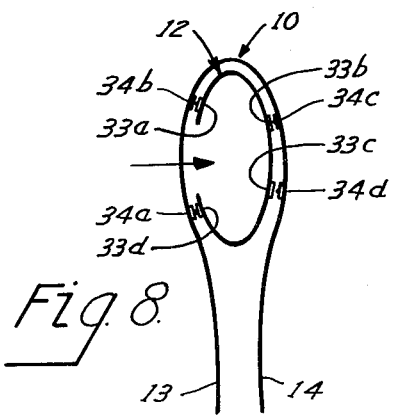
FIGS. 8 and 9 are diagrammatic right end elevations of the ventilator showing how it may be reversed so as to face in opposite directions relative to the ventilator body.
Figure 9:
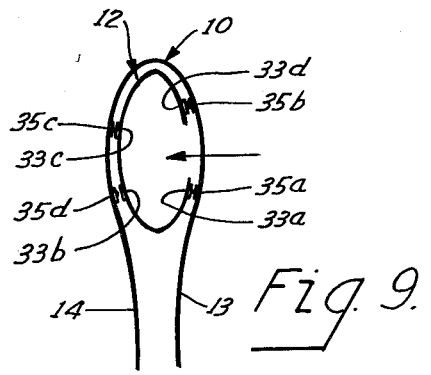

As illustrated in FIGS. 7 through 9, assuming the sheet in FIG. 7 is to be folded so as to dispose the flap 13 forwardly and the flap 14 to the rear of the seat cushion back 7, then when installing the deflector 12 at the right-hand edge of the margin of the body 11, the snap fasteners 33a, 33b, 33c and 33d, as illustrated in FIG. 8, are connected to snap fasteners 34b, 34c, 34d and 34a, in the order recited. When it is placed at the opposite edge or right edge of the body, the snap fasteners 33a, 33b, 33c and 33d are connected to the snap fasteners 35a, 35b, 35c and 35d, in the order recited.

In many instances, as illustrated, the front and rear flaps may be identical, in which case it is unnecessary to remove the draw string 27. All that is necessary is to remove the ventilator 10 from one seat back, reverse its faces and slide it onto the opposite seat back, remove the deflector 12, rotate it about the axis of the hood 180°, and replace it in the same end of the hood so that it is facing forwardly, as indicated by the dotted line position 12a in FIG. 2, in the new position of the hood due to the ventilator having been reversed. This is particularly desirable if the seat cushion back 7 used for the right-hand seat is the same size and shape as that used for the left end in FIG. 1. In such cases, the string 27 could be omitted and the corresponding end of the hood riveted, or otherwise, closed. On the other hand, the ventilator may be shifted to the opposite seat without turning it face for face, in which case the scoop and string 27 are shifted to opposite ends, as before described.

The ventilator body 11 preferably is made of a relatively stiff but resilient sheet material and preferably is made from a single sheet preformed to the form illustrated during the curing or hardening. For this purpose, while the sheet is still somewhat formable and settable, it is folded so as to provide the hood portion 15 and the flaps 13 and 14, and the draw string 22 is inserted through the row of apertures adjacent to the bottom of the sleeve, that is, the uppermost row of apertures, and tied, thus drawing the front and rear flaps into or nearly into juxtaposition at the base of the hood 15. Thus the string assists not only for adjustment use but also in the preforming of the ventilator during manufacture, because it is only necessary when the sheet is folded to install the draw string and then store the sheet for use, whereupon further cooling and curing will cause the preformed shape desired to be imparted.

The preformed or channel shape of the hood 15 imparts considerable strength and permits the use of relatively thinner sheet material than otherwise would be required. It permits use of plastic, such, for example, as polyethylene.

The provision of the collar 30 on the deflector 12 reinforces and strengthens the hood 15 and prevents its being collapsed at the entry or open end, as might otherwise happen, especially when used by those car drivers who lean concurrently against the door and the back of the front seat.

The device is preferably installed on the seat cushion so that the deflector 12 is just above the lower boundary of the window opening 3 and so that its outboard edge is just inside the window pane 9. The lower edge of the deflector 12 may be rounded, as indicated at 38, so that, should the seat cushion be shifted unduly, the deflector will not interfere with the opening in the window but will be cammed and flexed to permit passage of the pane for closure of the window.

The device may be installed on the seat cushion in an off-center relation, as illustrated in FIG. 2, so that air can be received and forced downwardly from the inner edge of the collar 30 of the deflector 12 and enter substantially the full length of the top edge of the back 7. Also, some air can reach the outboard lateral edge of the back 7.

The installed ventilator operates off of the so-called boundary or angular air stream that flows into an open automobile side window. Generally, this air stream is a result of swirling of the air stream deflected by the windshield, and it passes through the open window just forwardly of the back of the front seat. Thus a very adequate flow of air without the protrusion of any part of the ventilator outwardly beyond the window pane is provided. This is advantageous in not interfering with opening and closing the window in case of showers and the like, and also in assuring that the ventilator will not conflict with any state laws.

The ventilator introduces air along the entire upper edge of the cushion back 7 and also along the outboard upright edge. Due to the curvatures employed, a sufficiently rigid structure to operate effectively can be obtained with relatively thin gauge synthetic organic plastic sheet material.

A modified means may be used for securing the deflector in the hood of the ventilator. For example, a ventilator, indicated generally at 50, is illustrated in FIG. 10. It is essentially the same in all respects as the one heretofore described, except that at one end of its hood 51, the collar 52 is provided. The inner end of the collar 52 is permanently secured, as riveted by rivets 53, to the wall of the hood. This collar forms with the wall of the hood a channel or groove, indicated generally at 54, into which the inner end 55 of the deflector 56 can be inserted and held frictionally. To assure enough grip, the collar may be riveted to the hood wall while the sheet stock and collar stock are flat and planular. The difference in the internal diameter and external diameter of the combined parts when shaped into the hood causes the collar to press resiliently against the inner wall surface of the hood so that it must be forced away therefrom by the inner end portion 55. This specific means provides an effective holding of the deflector in any selected rotated position about the longitudinal axis of the hood. Therefore, the ventilator may be turned face for face and used on a left hand or right hand cushion and the deflector properly positioned for introducing air into the hood. An important feature is the great flexibility afforded by readily detachable fastening so that the same parts can readily be installed, adjusted and assembled for right or left hand seat cushions for meeting wide variations in cushion and automobile body interior arrangements.

Referring to FIGS. 11 through 18, a modified form of the ventilator and manners of adjustment for right and left seats are illustrated diagrammatically.

The ventilator body, indicated at 60, is shown flat, and a deflector 61 is secured thereto at the transversely extending center line of the body. The deflector may be integral with the body 60, but preferably is a separate element secured to the body, as by rivets 62, or cement, so as to provide a double wall thickness for rigidity and to save material.

In each of the figures, the starting upper margin is designated "$t$" and the lower margin "$b$."

Figure 11:
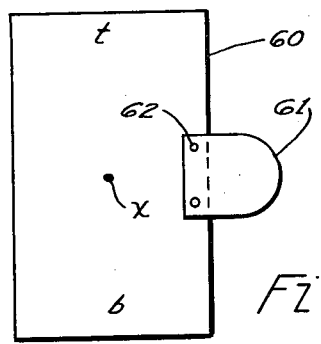
FIG. 11 is a diagrammatic front elevation of a modified form of the ventilator laid in unfolded condition for convenience in illustrating certain manners of functioning.
Figure 12:
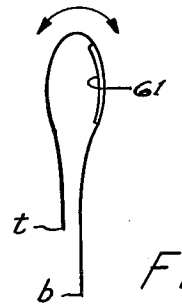
FIG. 12 is an end elevation of the ventilator in FIG. 11, illustrating one manner of adjusting it for left-hand seat.

Starting with the position in FIG. 11, the upper edge "$t$" is folded down forwardly to a position spaced above the lower edge "$b$," as illustrated in FIG. 12, so that the deflector 61 faces forwardly and is at the rear wall of the ventilator and thus positioned for a lefthand cushion.

Figure 13:
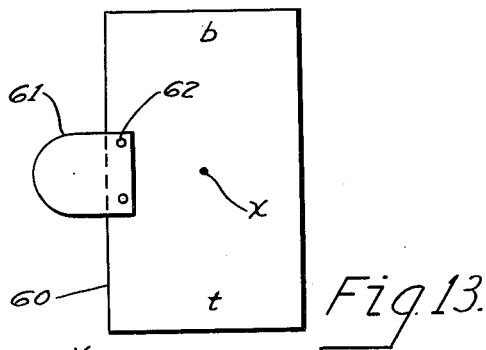
FIGS. 13 and 14 are views corresponding to FIGS. 11 and 12, respectively, showing another position and adjustment.
Figure 14:
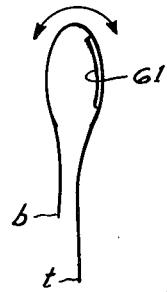

By rotating the sheet about the point $x$, to the position illustrated in FIG. 13, the lower edge is disposed at the top. By folding it down forwardly to the position shown in FIG. 14, the deflector is properly positioned at the opposite end for the outboard margin of a right-hand cushion.

Figure 15:
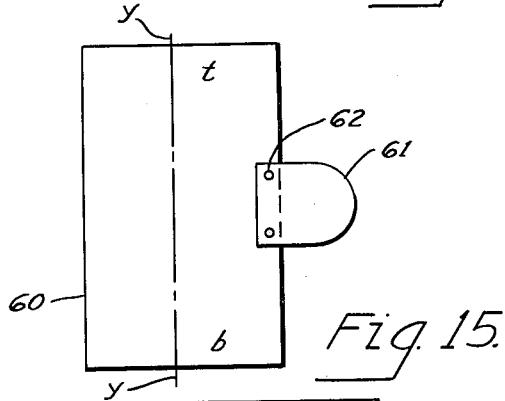
FIGS. 15 through 18 are views corresponding to FIGS. 11 through 14, respectively, showing another adjustment of the ventilator.
Figure 16:
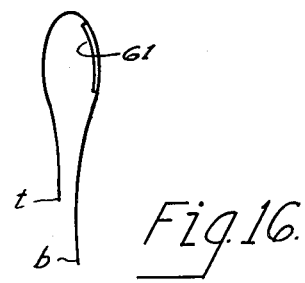
Figure 17:
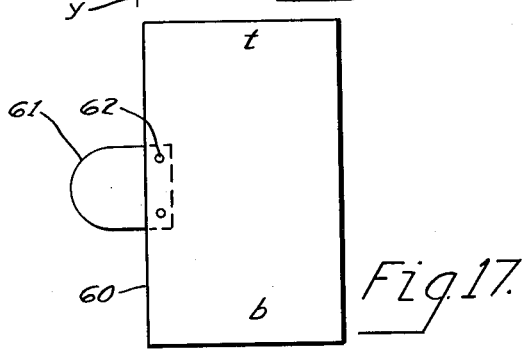
Figure 18:
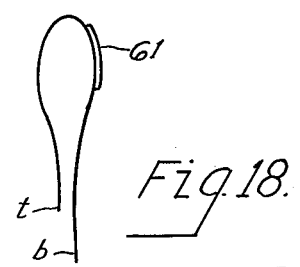

Referring to FIGS. 15 and 16, the starting position and the folding are the same as in FIGS. 11 and 12. By rotating the sheet about the axis $y$—$y$ to the position illustrated in FIG. 17, leaving the upper edge at the top, and then folding it down short of the lower edge, as indicated in FIG. 18, the ventilator is arranged for a right-hand cushion.

Figure 19:
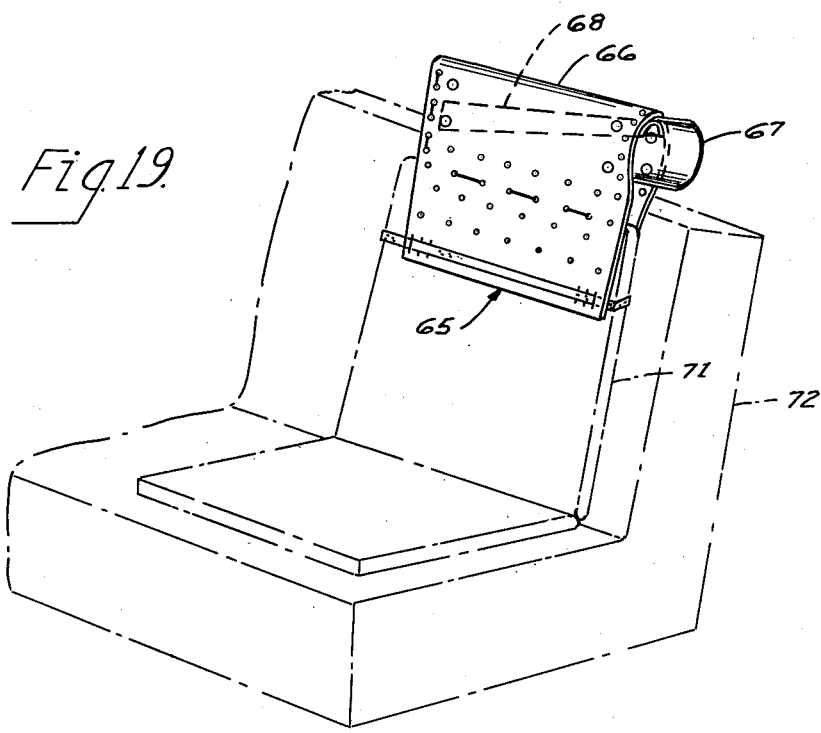
FIG. 19 is a perspective view of the ventilator with a reinforce in the hood of the ventilator, a portion of the seat and ventilating cushion being shown to illustrate the relation of the parts of the ventilator thereto.

Referring next to FIG. 19, a ventilator indicated generally at 65 and having a hood 66 is illustrated. This ventilator may be the same as that illustrated in FIG. 1 and may be correspondingly mounted on the back ventilating cushion of a front seat, as described in connection with FIG. 1. The ventilator has a deflector 67 at the inlet end of the hood. Mounted within the ventilator is a rigid reinforce 68 of which an essential purpose is to reinforce the hood against collapse by the pressure of the body of the occupant of the seat, and thus permit the use of a ventilator of thinner material.

Figure 20:
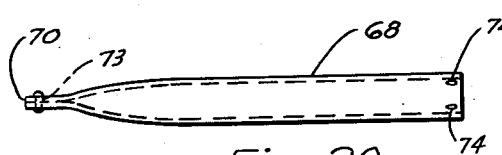
FIGS. 20 and 21 are an enlarged top plan view and a side elevation, respectively, of the reinforce used in the ventilator in FIG. 19.

In the form illustrated, the reinforce 68 is a sheet of relatively stiff material which is formed into a channel, as best illustrated in FIG. 20. At its inlet end, indicated at 69, it is generally semi-circular in cross section so as to receive air from the deflector and conduct it transversely of the hood. The other end of the reinforce is closed, preferably by collapsing the channel transversely at that portion so that the side walls are juxtaposed, as indicated at 70. Thus the reinforce not only fits snugly into the hood 66, but it also operates as an air deflecting channel. Preferably it slopes downwardly from the end adjacent the deflector 67 to the opposite end of the hood for properly distributing the air lengthwise of the hood and thence lengthwise of the top edge of the ventilating seat cushion 71 of the seat 72. The manner in which it is installed is secondary, but if the ventilator is one in which the laces or tie strings are to be used to close one end of the hood, these may be passed through apertures, such as indicated at 73, adjacent the closed end of the reinforce. Apertures 74 can be provided at the opposite end and so that the reinforce may be secured by a separate tie string at that end of the hood. However, if desired, the reinforce may be secured by the conventional snap fasteners of the same type as used on the deflector 12 heretofore described. Again, it may be riveted, or cemented, in place, the specific manner of attachment not being important.

Figure 21:
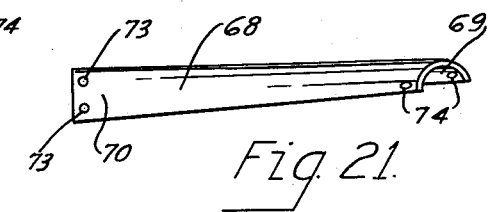
Figure 22:
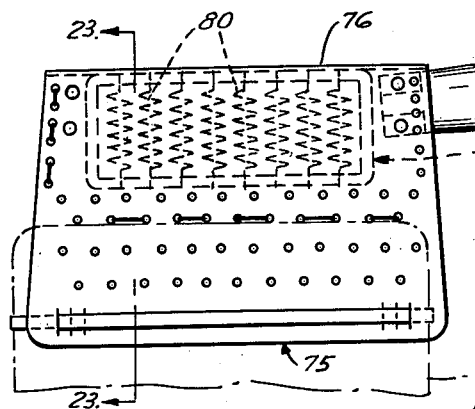
FIG. 22 is a front elevation of the ventilator, and a portion of the seat and ventilating cushion, with a modified form of the reinforce in the hood of the ventilator.
Figure 23:
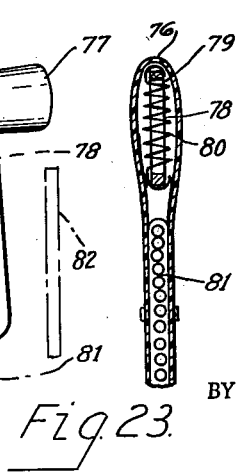
FIG. 23 is a right end elevation of the ventilator and ventilating cushion shown in FIG. 22.
Figure 24:
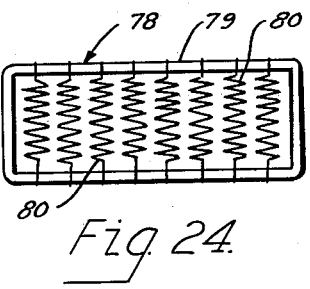
FIG. 24 is an enlarged front elevation of the reinforce used in the ventilator illustrated in FIGS. 22 and 23.

Referring next to FIGS. 21 to 23, a ventilator 75 is illustrated. It is the same as the ventilator 65 above described, has a hood 76 and deflector 77. Mounted between the front and rear walls of the ventilator and extending upwardly and into the hood is a reinforce 78. The reinforce 78 comprises a frame 79 which supports a plurality of open coil springs 80. The springs may be arranged to extend transversely of the frame as illustrated, or lengthwise thereof if desired. Preferably each spring is fixedly secured at its opposite ends to opposite sides of the frame. The springs substantially abut each other laterally. They may be arranged in the same manner as those in a conventional ventilating seat cushion. This reinforce is so disposed that when the ventilator is mounted on a ventilating seat cushion 81, as illustrated, the portion of the ventilator extending from the hood substantially to the top edge of the ventilating seat cushion 81 is reinforced against collapse due to body pressure. Also, the reinforce assures free passage of air to the top edge of the ventilating seat cushion 81. As hereinbefore mentioned, the deflector, such as the deflector 77, preferably terminates at its outboard end close to or inwardly from the outer face of the front door window pane 82 so as not to interfere with opening and closing the window. It may be made of material resilient enough so that, if engaged by the window, it will flex inwardly and permit the window to be raised.

As mentioned, the ventilators described preferably are made of plastic, but other materials may be used. High density polyethylene, for example, is suitable, as it can be made very thin yet rigid enough to prevent collapse by the body of the car operator under normal conditions.

Having thus described my invention, I claim:

1. A ventilator for a ventilating back cushion for vehicle seat backs and comprising a body having a portion in the form of an elongated inverted channel of sheet material, said channel having a top wall and front and rear walls depending from the top wall and spaced apart from each other and forming between their lower margins passage means for discharging air from the channel into the upper margin of a ventilating back cushion of a vehicle seat along the major portion of the width of the cushion, connecting means depending from the front and rear walls of the channel, respectively, for detachably connecting the channel in the inverted position in an operative relation to the ventilating back cushion wherein the top wall is spaced above the level of the upper edge of the back cushion and the passage means opens downwardly and extends along and in alignment with the major portion of the top margin of the back cushion for discharging air from the passage means of the channel into the cushion through the top edge thereof, said channel having an opening at one end, an air deflector connected to, and supported by, the body at said end of the channel in a position wherein it projects, endwise of the channel, a short distance relative to the length of the channel outwardly from said end of the channel generally endwise of the channel, said deflector having a forward face spaced rearwardly from the front wall of the channel and having its inner end aligned with the channel opening for deflecting air striking said forward face into the channel opening, and obstructing means at the other end of the channel opposite from the opening for obstructing the escape of air through said other end endwise of the channel at least to an extent to cause most of the air deflected into the channel to pass directly through said passage means for entry into the top edge of the cushion.

2. A ventilator according to claim 1 wherein said one end of the channel is open and provides said opening, said deflector is of self restoring material and is resiliently contractible generally radially of an axis extending lengthwise of the channel and has a margin at its inner end adapted, upon radial contraction of the deflector, to fit into the open end of the channel and, when released, to return to its uncontracted condition and thereby reinforce and stiffen the peripheral wall of the channel at said open end.

3. A ventilator according to claim 1 wherein deflector connecting means are provided on the channel and connect the deflector detachably to the channel with the deflector concave forwardly.

4. A ventilator according to claim 1 wherein a collar is provided in the open end of the channel and defines with the marginal wall of the channel a narrow peripherally extending channel means open toward said end, and said deflector has a marginal portion receivable in, and frictionally held in, said channel means.

5. A ventilator according to claim 1 wherein the deflector has a deflecting portion extending into the open end of the channel and positioned to direct the deflected air downwardly on a bias to the length of the channel.

6. A ventilator according to claim 1 wherein the channel and deflector are separate detachable members and each is composed of a single piece of sheet material.

7. A ventilator according to claim 1 wherein the body at the lateral edge at which the deflector is attached, is open for its full length in said operating position.

8. A ventilator according to claim 7 wherein said edge of the body is spaced from the outer edge of the back cushion in the outboard direction to guide air into the outboard edge of the back cushion.

9. A ventilator according to claim 1 wherein said connecting means include a band of elastic material spaced below the open side of the channel and adapted to embrace the back cushion when the ventilator is in installed position.

10. A ventilator according to claim 1 wherein said connecting means includes portions of said front and rear walls, which portions extend below the top wall a distance so as to be juxtaposed against the front and rear faces, respectively, of the upper portion of the back cushion when the ventilator is installed in operating position.

11. A ventilator according to claim 10 wherein said connecting means are arranged so that the body can be installed in operating position on the cushion back with the front and rear walls disposed at the forward face of the back cushion, selectively, and deflector connecting means are provided at the inner margin of the deflector and at both ends of the channel for connecting the deflector to the body with the forward face of the deflector disposed adjacent whichever one of the two last mentioned walls is disposed at the rear face of the back cushion, and with said forward face of the deflector facing forwardly.

12. A ventilator according to claim 1 wherein reinforcing means are disposed within the ventilator and reinforce it against collapse in a direction forwardly and rearwardly of the ventilator.

13. A ventilator according to claim 10 wherein the front and rear walls are in spaced face to face relation, and open abutment means are provided on the front and rear walls and bridge across the space between the adjacent inner faces of the front and rear walls and thereby provide an abutment for limiting movement of the body in a direction toward the bottom of the back cushion.

14. A ventilator according to claim 13 wherein the abutment means comprise a plurality of apertures in the front and rear walls spaced from each other in a direction lengthwise of the body, and flexible tie means are threaded through selected ones of the apertures so as to bridge between the flaps.

15. A ventilator according to claim 14 wherein said apertures are arranged in groups, and the apertures of each group are arranged different distances from each other in a direction away from the channel so that the distance of the abutment from the top wall of the channel can be adjusted by passing the flexible tie means through selected ones of the apertures.

16. A ventilator according to claim 1 wherein deflector fastening means are provided and detachably connect the deflector to the body, and said fastening means include fastening portions on the inner margin of the deflector, complementary fastening portions on the channel near the opening and cooperable with those on the deflector for securing the deflector to the channel in different operating positions.

17. A ventilator according to claim 16 wherein said fastening portions on the body are arranged for connecting the deflector selectively in different operating deflecting positions in the channel at opposite ends of the channel, selectively, and the obstructing means are arranged in position in the channel to restrict only the end of the channel opposite from the deflector, selectively.

18. A ventilator according to claim 1 wherein fastening means are arranged for detachably connecting the deflector to the channel in a plurality of rotated positions of the deflector about the longitudinal axis of the channel.

19. A ventilator and ventilating back cushion combination including a back cushion having a ventilating back portion adapted to lie against the forward face of an automobile seat back and being adapted to admit air into its interior along its upper portion, a ventilator body having at the top an inverted downwardly open channel with an open end and being restricted or closed at the other end for receiving air through the open end and causing it to enter and discharge downwardly through the open side of the channel, connecting means on the channel for detachably supporting the channel with its top wall spaced above the top edge of the back cushion and its open side facing downwardly for directing the air into the upper portion of the back cushion along the major portion of the width of the cushion, an air deflector connected to the body at the open end of the channel and projecting endwise of the channel a short distance outwardly from the open end of the channel, said deflector having a forward face arranged to deflect air striking said face toward the inner end of the deflector, the inner end of the deflector being aligned with the open end of the channel so that the deflected air from the deflector may enter the channel, said deflector terminating outwardly a relatively short distance from the open end of the channel such that, when the cushion is in operative position on the seat, the outer end of the deflector is disposed inwardly of the plane of the outer face of the body at the window opening adjacent to the seat whereby the deflector does not project outwardly beyond the body.

20. The combination according to claim 19 wherein said deflector is resilient enough so that if it is engaged at its outer margin by a window pane at the window opening during raising of the pane, the deflector can be flexed by the pane to permit passage of the pane.

References Cited in the file of this patent
UNITED STATES PATENTS

| 2,791,956 | Guest | May 14, 1957 |
| 2,931,286 | Fry | Apr. 5, 1960 |